United States Patent [19]

Wahl et al.

[11] Patent Number: 4,487,186
[45] Date of Patent: Dec. 11, 1984

[54] METHOD AND APPARATUS FOR OPTIMIZING THE OPERATIONAL VARIABLES OF AN INTERNAL COMBUSTION ENGINE

[75] Inventors: Josef Wahl, Stuttgart; Peter Schmidt, Schwieberdingen, both of Fed. Rep. of Germany

[73] Assignee: Robert Bosch GmbH, Stuttgart, Fed. Rep. of Germany

[21] Appl. No.: 323,795

[22] Filed: Nov. 23, 1981

Related U.S. Application Data

[63] Continuation-in-part of Ser. No. 63,632, Aug. 2, 1979, abandoned.

[30] Foreign Application Priority Data

Oct. 28, 1978 [DE] Fed. Rep. of Germany ....... 2847021

[51] Int. Cl.$^3$ .............................................. F02D 33/00
[52] U.S. Cl. .................................. 123/436; 123/419; 123/438; 123/478; 123/585
[58] Field of Search ............... 123/415, 416, 417, 438, 123/478, 480, 486, 585, 419, 436, 361, 399, 492, 493

[56] References Cited

U.S. PATENT DOCUMENTS

| | | | |
|---|---|---|---|
| 3,759,232 | 9/1973 | Wahl et al. | 123/589 |
| 4,015,566 | 4/1977 | Wahl | 123/415 |
| 4,026,251 | 5/1977 | Schweitzer et al. | 123/419 |
| 4,047,507 | 9/1977 | Noguchi et al. | 123/478 |
| 4,064,846 | 12/1977 | Latsch et al. | 123/419 |
| 4,112,885 | 9/1978 | Iwata et al. | 123/361 |
| 4,172,433 | 10/1979 | Bianchi et al. | 123/486 |
| 4,191,146 | 3/1980 | Taplin | 123/415 |
| 4,197,767 | 4/1980 | Leung | 123/419 |
| 4,200,064 | 4/1980 | Engele | 123/480 |
| 4,235,204 | 11/1980 | Rice | 123/480 |
| 4,285,319 | 8/1981 | Hattori et al. | 123/585 |
| 4,286,560 | 9/1981 | Sagisaka et al. | 123/416 |
| 4,322,800 | 3/1982 | Hisegawa et al. | 123/417 |

FOREIGN PATENT DOCUMENTS

2034930 6/1980 United Kingdom ............... 123/585

Primary Examiner—Andrew M. Dolinar
Attorney, Agent, or Firm—Edwin E. Greigg

[57] ABSTRACT

A method and apparatus for optimizing operational variables of an internal combustion engine, such as the output, or the fuel consumption, by means of the variation of engine variables and the detection of the relative variations thus resulting in the operational variables and a corresponding follow-up of the engine variables which includes a control device, with which the engine variables are preset and are variable at selectable times and/or upon the appearance of certain operational variables or changes in operational variables and the corresponding reactions serve for determining the optimum output and/or the minimum specific fuel consumption. Thus, on the basis of the most precise possible presetting of the various values, a change in the engine variables and a corresponding change in the individual variables in accordance with the particular reaction at that time take place only at fixed times or at fixed combinations of operational variables. A change in the mixture is attained by way of the valve in a bypass channel bypassing the engine throttle valve and the fuel quantity is varied in accordance with the reaction.

4 Claims, 5 Drawing Figures

METHOD AND APPARATUS FOR OPTIMIZING THE OPERATIONAL VARIABLES OF AN INTERNAL COMBUSTION ENGINE

BACKGROUND OF THE INVENTION

This is a CIP of Ser. No. 063,632, filed Aug. 2, 1979, now abandoned.

The invention relates to a method and apparatus for optimizing the operational variables of an internal combustion engine. An extreme-value control means is known for a carburetor or fuel-injection system in an internal combustion engine, in which an additional air flow is brought to the main throttle valve after the carburetor and this additional air flow is split up into two controllable partial flows. A first partial air flow is varied periodically, and the second additional air flow is varied, in accordance with the reaction of the internal combustion engine, by means of a controllable additional valve. As a result of thus subdividing this additional air flow and the separate control of the different partial flows, there is a substantial expenditure for parts and thus high costs. It has also proved unfavorable to have the optimizing process run continuously and without taking into consideration individual operational variables.

OBJECTS AND SUMMARY OF THE INVENTION

The apparatus in accordance with the invention has the advantage over the prior art in that the optimizing process takes place only when it is desired and in this sense, it undertakes a monitoring function. Thus, it is useful for instance, in optimizing the specific fuel consumption, to perform an appropriate process at times to be selected, and/or upon the appearance of predetermined operational variables or changes in the operational variables. It is naturally a precondition for such a process that there be the most precise possible presetting of the operational mixture, for instance, in accordance with rpm and the throttle valve angle.

It has also proved to be useful to use the throttle valve bypass, which serves to control engine warm-up, for instance, or the idling rpm, to form an optimizing trigger signal as well. In this manner, it is not necessary to go to any substantial additional expense to generate a shift as the output signal for the optimizing process.

In the known optimizing apparatus, the air component of the mixture was varied in the optimizing process. However, a more rapid optimizing process is attained, for instance, in a fuel-injection system, by intervening directly in the fuel metering, because this metering occurs spatially very shortly before the inlet valve of the internal combustion engine and thus long transit times are not involved.

The invention will be better understood as well as further objects and advantages thereof become more apparent from the ensuing detailed description of preferred embodiments taken in conjunction with the drawings.

DESCRIPTION OF THE PREFERRED EMBODIMENTS

Figure 1:
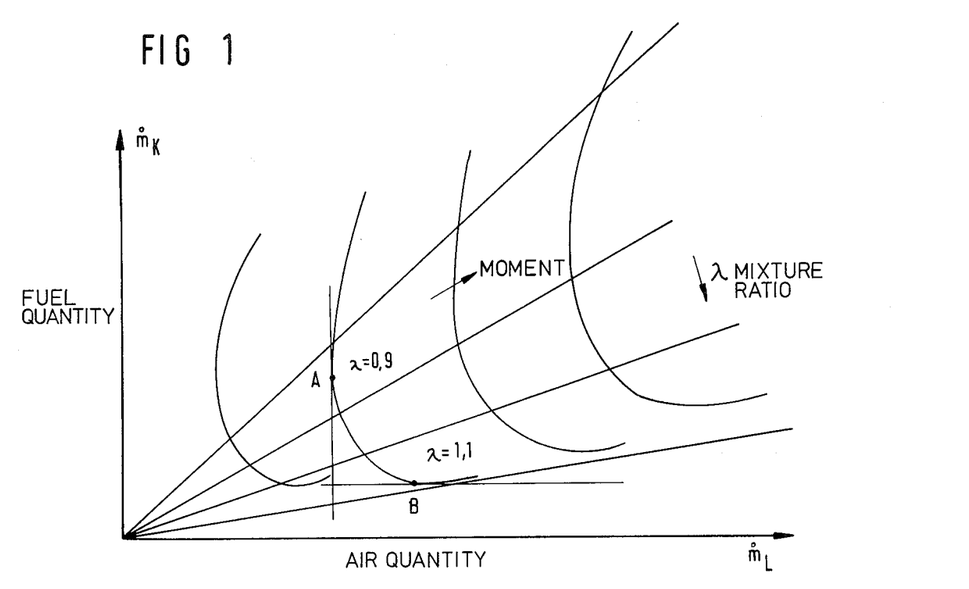
FIG. 1 is a diagram showing final rotary torque in accordance with the fuel and air quantity.

FIG. 1 is a final rotary torque diagram shown in accordance with the fuel and the air quantity for a particular internal combustion engine. The air quantity $\dot{m}_L$ over time is plotted on the abscissa and the fuel quantity $\dot{m}_K$ over time is plotted on the ordinate. Because the mixture ratio λ indicates the quantity of air to fuel per unit of time, various λ values appear as various straight line crossing the point of origin. Points of identical moment are plotted on hyperbolic curves, with increasing distance from the origin characterizing an increasing moment.

Two points, A and B, are indicated in the diagram of FIG. 1. They represent the vertical and the horizontal tangential points on the characteristic moment curve. In a physical sense, these tangents signify that at point A, during operation of the engine and at a constant throughput of air, a change in the throughput quantity of fuel produces no further incease in output. In fact, it produces a drop in output. In this respect, point A indicates the optimum fuel quantity at a given throughput of air for attaining the highest possible output at this given air throughput. Similarly, point B characterizes the point on the constant-output curve representing the least specific fuel consumption, because here the curve representing a constant moment reaches its lowest point with respect to the fuel quantity over time.

The purpose in optimizing the specific fuel consumption is thus to maintain this point B at every rpm level or at every moment level in the engine. It is attained whenever there is only a negligible change in rpm appearing in connection with a change in air quantity. The awareness of this fact is made use of both by the prior art and by the proposed invention. However, there is a difference in the frequency with which the optimizing process is performed and in the manner in which point B is attained.

Figure 2:
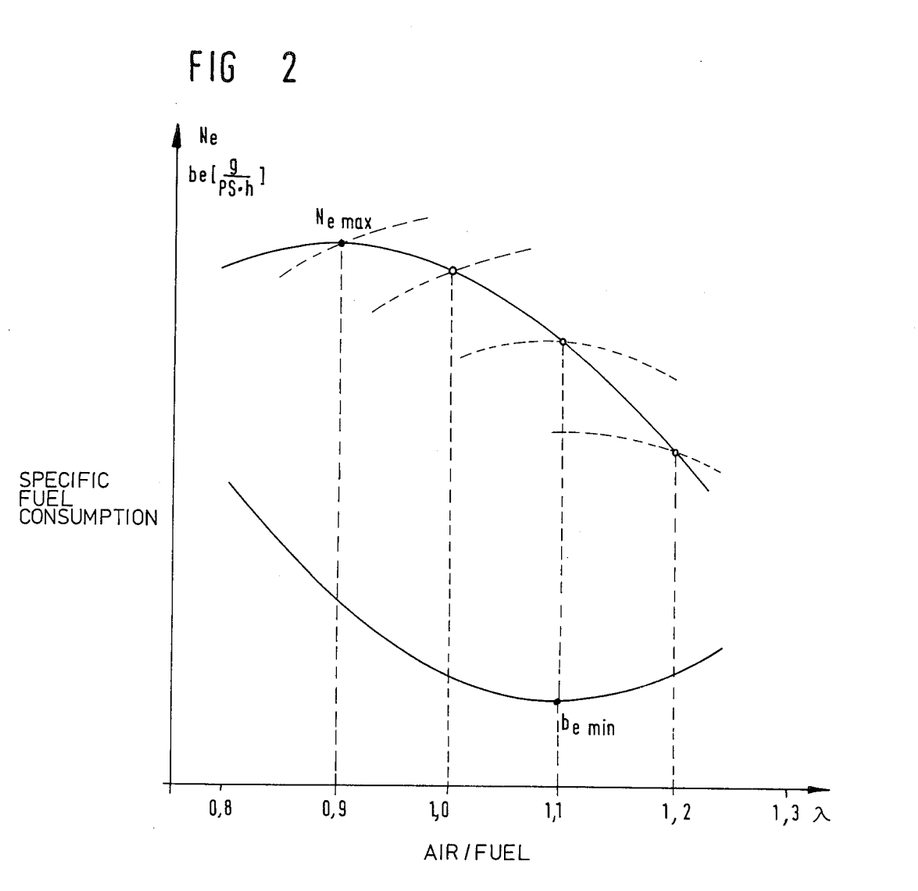
FIG. 2 is a curve for specific fuel consumption and a curve for output, entered over λ.

In FIG. 2, the courses of the output and of the specific fuel consumption are plotted in accordance with the air-to-fuel ratio λ. These curves apply for a constant operational point and for an air-guided mixture preparation. That means that the λ shift is attained by a variation in the fuel quantity. If, in such a system, the air quantity and therefore the air-fuel ration are varied, based on a predetermined operational point (the given λ value), then the output curves indicated in broken lines are the result. As an example, at the point of minimum fuel consumption being (λ=1.1) and with a constant fuel quantity, no further increase in output can be attained by making a variation in λ by means of the air quantity. At the other operational points, in contrast, the output can be increase in the range above λ=1.1, by the withdrawal of air, and in the range below λ=1.1, by the addition of air. The same is true for all other operational points of the internal combustion engine.

Figure 3:
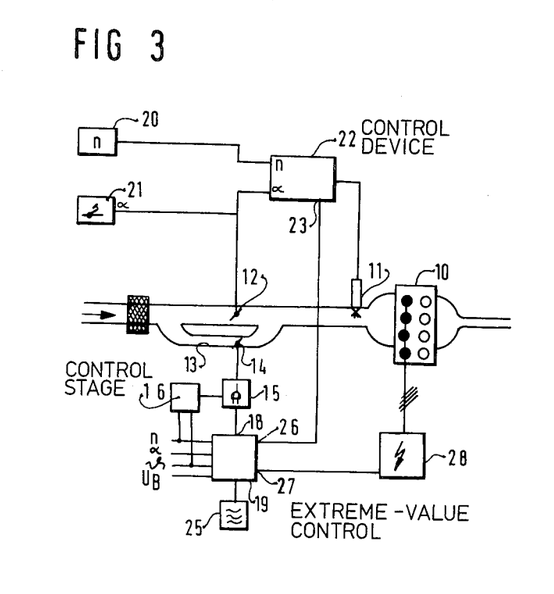
FIG. 3 is a schematic representation of an apparatus for controlling both in injection quantity and the instant of ignition.

FIG. 3 is a basic block diagram of an apparatus for optimizing operational variables of an internal combustion engine. It comprises a known α-n control device, a special-operation control stage for warm-up idling and acceleration, and an extreme-value control apparatus.

Reference numeral 10 indicates an internal combustion engine in the intake manifold of which there is at least one injection valve 11 acting as a fuel metering device and also a throttle valve 12 with a bypass channel 13. An auxiliary valve 14 is located in this bypass channel 13 and receives a trigger signal via a connecting stage 15 from a special-operation control stage 16, in the event of idling, warm-up, or acceleration, for example. The connecting stage 15 is further coupled to an output 18 of an extreme-value control apparatus 19.

Reference numeral 20 indicates an rpm meter and 21 indicates a transducer for the position of the gas pedal. The transducer 21 effects a corresponding displacement of the throttle valve 12. Based on the rpm and the throttle valve angle $\alpha$, the $\alpha$-n control device 22, which in the simplest case contains a read-only memory (ROM), furnishes a metering signal for the injection valve 11. The $\alpha$-n control device 22 can receive an appropriate correction signal from the extreme-value control apparatus 19, via a correction input 23.

Part of the arrangement of FIG. 3 as described above is known. In this apparatus, a metering signal is furnished based on signals for rpm and the throttle valve angle, and fuel is accordingly injected via the injection valve 11 into the intake manifold of the internal combustion engine 10. The controllable bypass valve 14 serves to set or control the air quantity for warm-up, idling and acceleration.

In the arrangement of FIG. 3, however, it serves additionally to generate a test signal for the purpose of extreme-value control. To this end, an extreme-value control apparatus 19 is supplied with various operational variables, such as rpm, throttle valve angle, temperature and operational voltage in the electrical system.

In addition, an oscillator 25 is coupled with the extreme-value control apparatus 19, in order to furnish a timing signal. The extreme-value control apparatus 19 has two further outputs 26 and 27 in addition to the output 18. While the output 26 is coupled with the correction input 23 of the $\alpha$-n control stage 22, the output 27 is connected with an ignition control stage 28. On the basis of various input variables, the ignition control stage 28 furnishes the instant of ignition required at a particular time and triggers the spark plugs (shown schematically) of the engine 10 accordingly. With the schematically illustrated arrangement of FIG. 3, the mixture composition and the instants of ignition can be optimally determined.

The mode of operation of the arrangement of FIG. 3, as an optimizing apparatus, will now be explained with the aid of FIG. 1. Let the point of departure be point A, for purposes of illustration; that is, a point on a moment line at which the internal combustion engine is not functioning optimally with respect to the specific fuel consumption. On the basis of a signal from the oscillator 25 and a corresponding indication from the extreme-value control means 19, the bypass valve 14 is briefly opened more widely. As shown in the graph of FIG. 1, this means a new point to the right of point A and thus higher moment. Because, as a rule, the increase in moment also corresponds to an increase in rpm, an appropriate rpm differential signal results from the increase in air quantity, which signals the control apparatus that engine operation is not optimal.

In reaction to this, the control apparatus 19 forms a corresponding correction signal for the $\alpha$-n control stage 22 and the quantity of fuel to be injected is reduced. In the event that the air throughput remains the same, however, this would correspond to the showing in FIG. 1 of a reduction in moment. In order to remain on the same moment line, the air throughput must be accordingly increased. This is effected by the driver, who in any case already continuously adapts the rotary torque and thus the output to traffic conditions by way of the throttle valve 12. The intervention on the part of the control means into the quantity of fuel to be injected is preferably performed in relatively small steps and at relatively long time intervals. The change in moment brought about in this manner does not enter the driver's awareness. Such an intervention can also be performed by way of the auxiliary valve 14 in the bypass channel 13.

In so doing, the object of the extreme-value control apparatus is to undertake the optimizing of the mixture formation at a constant rpm or vehicle velocity while attaining a minimum in fuel consumption. The increased metering of air is thus controlled by way of the throttle valve 12 or the auxiliary valve 14, and if the fuel withdrawals and air quantity additions are sufficiently small, repeated optimizing produces a polygonal course approximately the characteristic quantity curve up to point B. When this point is attained, then, in the event of a variation in air quantity, there is no further substantial change in rpm, which is interpreted in the graph of FIG. 1 as an optimal point with respect to the specific fuel consumption. The optimizing process can then be terminated when operational variables remain the same.

In order to prevent the misinterpretation of an rpm differential signal resulting as a consequence of the brief opening of the bypass valve 14, since this may also be a signal deriving from a variation in the operational state, the resultant reaction to the opening of the bypass valve 14 is first stored. Then, after the resetting of the bypass valve 14 to the outset value with the aid of a comparison device, it is ascertained whether or not the operational state of the vehicle has changed during the time the bypass valve 14 was opened. Only then is it decided, with the aid of logic element, whether the resultant rpm differential signal will be admitted as the reactive release for the correction signal for mixture metering, or not.

A particularly advantageous embodiment of the invention is attained with the use of an electronic gas pedal (in association with a vehicle velocity governor). In this case, the connection between the gas pedal and the throttle valve is severed and then replaced with a position indicator for the gas pedal and a control element at the throttle valve (with electronic triggering). A bypass valve can thus be omitted. Warm-up, idling, acceleration enrichment and the generation of the test signal can then be effected directly with the throttle valve.

Theoretically, a repetition of the optimizing process is first necessary in the event of changed operational variables such as rpm or throttle valve position. It is therefore useful to provide recognition circuits for changes in the operational variables in the extreme-value control apparatus 19, and to initiate the optimizing process anew if predetermined degrees of change in these variables are exceeded. However, in order to be able to pay heed to purely time-related factors as well, it is also useful to repeat the optimizing process after certain time intervals, even without detectable variation in the individual operational variables.

In addition, the degree of deflection of the auxiliary or bypass valve 14 is advantageously selected for generating a test signal pertaining to a variation in air throughput in accordance with operational variables. The reason for this is that the effect of a particular variation in the auxiliary valve position is variable, depending on the position of the throttle valve 12. Thus, the reaction of the engine to a certain degree of deflection of the auxiliary valve 14 when the throttle valve 12 is nearly completely closed is substantially greater than the reaction when the engine is in the upper partial-load range.

The operational range in which the engine is functioning at a particular time is detectable by way of values such as those for rpm and the throttle valve angle α, and the test deflection of the auxiliary valve 14 can be selected in accordance with these variables. During full-load operation, the position of of the auxiliary valve 14 is of no consequence, because in this operational state the throttle valve 12 admits the air throughput through the intake manifold entirely freely. In this range, however, the operator of the vehicle is also seeking the maximum output from the internal combustion engine, and thus no longer desires a driving mode having the optimum specific fuel consumption.

The manner in which the correction signal from the output 26 of the extreme-value control apparatus 19 acts on the α-n control stage 22 may be either multiplicative or additive, or both. Preference is given to multiplicative variation, because influencing variables such as air density or temperature also affect the mixture formation in a multiplicative manner.

The arrangement of FIG. 3 shows the utilization of an extreme-value control apparatus 19 in connection with a particular type of fuel metering device. In general, every type of fuel or mixture metering is naturally conceivable in association with the extreme-value control, so long as it permits sufficiently precise presetting. Particular consideration is paid here to controlled carburetor systems. In any event, the reaction speed is lower in carburetor systems because of the longer mixture transit time.

The type of extreme-value control which is desired is also not restricted. Thus, referring again to FIG. 1, not only the minimum specific fuel consumption can be controlled, but the maximum output as well, by "triggering" point A as the point of contact with the vertical tangent to the characteristic moment line.

The mixture metering may, in addition, also be determined by so-called "teachable" control systems. In such systems, graphs for the injection or for the fuel metering in general are stored in a fixed-value memory and are transferred into a read/write memory when the engine is started, thus serving as a means of presetting. Then subsequently various graph values or graph ranges are corrected in accordance with operational variables and written into the memory.

In the arrangement of FIG. 3, the extreme-value control apparatus 19 also controls the ignition control stage 28 via its output 27. Thus, the extreme value for the instant of ignition can also be controlled, in the same way as is the mixture composition; that is, the instant of ignition is varied at certain times or under certain operational conditions, and the corresponding reaction on the part of the engine serves the purpose of extreme-value control. It has proved to be particularly advantages for the mixture composition and the instant of ignition to be controlled in alternation, to the particular extreme-value desired at that time.

Figure 4:
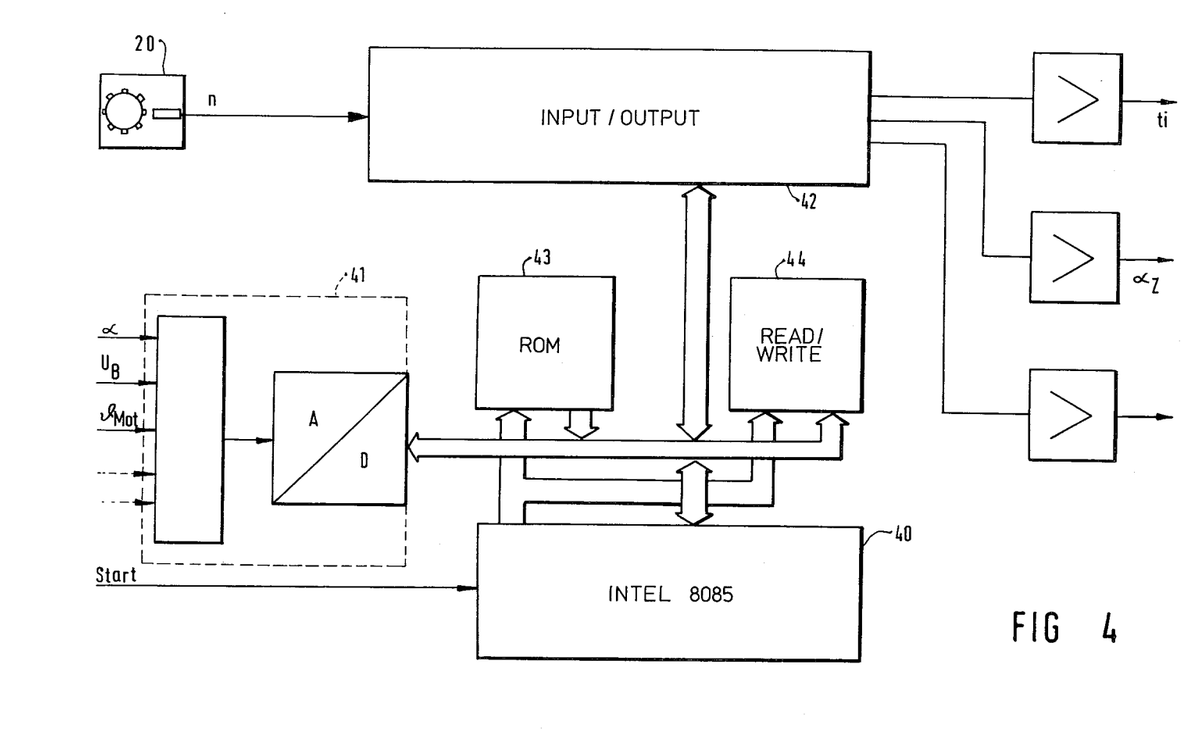
FIG. 4 shows the basic structure of one possible embodiment using an electronic computer.

While FIG. 3 represents a purely "hardware" kind of apparatus for optimizing operational variables in an internal combustion engine, the arrangement of FIG. 4 makes use of a computer unit. The actual computer unit (CPU) is designated by reference numeral 40. This computer unit 40 is coupled over data lines and address lines with input-output units 41 and 42 and with a read-only memory (ROM) 43 and a read/write memory 44. The input unit 41 is supplied with all the operational variables of the engine except for rpm, and an rpm signal is supplied to the input-output unit 42 from the rpm meter 20, in order to provide appropriate signals to the injection valves and the ignition coil in synchronism with the rpm.

The arrangement of FIG. 4 can be accomplished with the use of a computer of the type Intel 8085, a ROM of the type Intel 8355, a RAM of the type Intel 8155, and an output unit of the type Intel 8253. The process is carried out in the same manner as in the arrangement of FIG. 3, so that the programming presents no particular problems.

Figure 5:
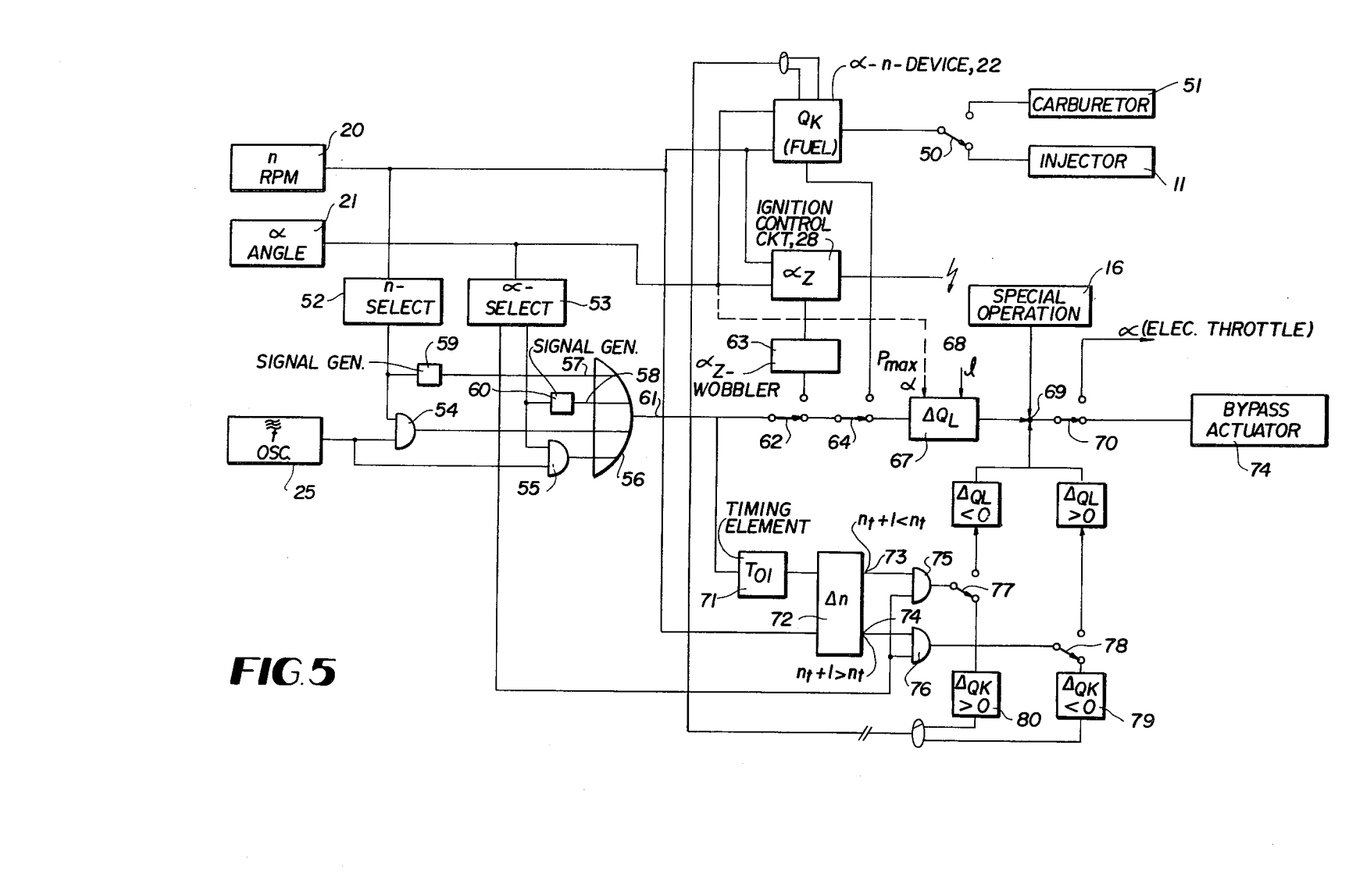
FIG. 5 shows a logic diagram which indicates the operation of the invention.

FIG. 5 depicts an illustration of the operation of the present invention. As far as possible, the individual elements of FIG. 5 are given the same reference numerals as those of FIG. 3.

The α-n control circuit 22 is connected with the rpm transducer 20 and the drive pedal position transducer 21, and on its output side it emits an output signal to an injection valve 11 or (illustrated by an alternating switch 50) to a controllable carburetor 51. The ignition control circuit 28, disposed in parallel to this, receives essentially the same input signals. 52 and 53 indicate selection circuits for the rpm and the drive pedal position, whose output signals are switched to AND gates 54 and 55. The second input signal for these AND gates is a time signal from the oscillator 25. The AND gates 54 and 55 are connected on the input side to an OR gate 56, which has further inputs 57 and 58 for specialized signals from the selection circuits 52 and 53. These signals appear whenever, by means of special signal generator circuits 59 and 60, a specific time duration with constant values for rpm and for the drive pedal position is ascertained. From the OR gate 56, a line 61 leads to an alternating switch 62, by means of which the optimization can be selected with respect to the mixture or the instant of ignition. In order to optimize the ignition, the ignition control circuit 28 is preceded by an ignition wobbler 63 for this purpose, as is known per se.

The alternating switch 62 is followed by a further alternating switch 64 for optimizing power or consumption. In the case of power optimization, as shown in FIG. 1, a variation of the fuel quantity is required. This is attained via a specialized input 65 on the control device 22 for the fuel metering. In order to optimize consumption, the alternating switch 64 is followed by a variation signal control circuit 67, which has supplementary means of intervention via separate inputs 68. A summing point 69 follows, as well as an alternating switch 70, which indicates the two possibilities for variation of a variable bypass by means of a bypass control element 14 or an electric gas pedal.

Reference numeral 71 indicates a timing element which furnishes the reference basis for the ascertainment of changes. This timing element could be either time-dependent or rpm-dependent, because its output signal indicates the duration of a plurality of crankshaft revolutions, for instance. The timing element 71 is followed by an rpm-variation detection circuit 72, by means of which a drop or increase in the rpm resulting from the optimizing process is detected. The signals on the two output lines 73 and 74 of circuit 72 are linked via AND gates 75 and 76 with an output signal of The α-selection circuit 53. This is in order that no optimization will take place in the case of changes in the drive pedal position desired by the driver. Such an optimization would necessarily have an effect on acceleration or deceleration processes.

Each of the AND gates 75 and 76 is followed by an alternating switch 77 and 78. In the illustrated position of these two switches, influence is exerted on the fuel quantity via appropriate leaning or enrichment circuits 79 and 80, respectively, which act upon the α-n control circuit 22 via appropriate inputs. This action may be effected by means of a shift in the performance graph, for instance.

The other switching position of the two switches 77 and 78 permits a control of the mixture on the air side, via an appropriate bypass setting.

The mode of operation of the circuit layout shown in FIG. 5 corresponds to that of FIG. 3. What is particularly shown in greater detail is the logic for the bringing about of an optimizing signal. Furthermore, the line 68 from the drive pedal position transducer 21 to the control circuit 67 makes it clear that the modulation signal is dependent on the drive pedal position. This is because the position of the drive pedal determines the position of the throttle valve, and in order to obtain a usable optimizing output signal, the change in bypass opening can be smaller when the throttle valve is relatively closed than when the throttle valve is relatively wider open.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. An apparatus for optimizing fuel consumption operational variables of an internal combustion engine comprising:
   means for detecting changes in operational variables of said engine;
   an intake manifold having a throttle valve and a bypass channel bypassing said throttle valve for controlling air flow to said engine;
   an auxiliary throttle valve in said bypass channel;
   a control means responsive to at least one of the following conditions: the appearance of at least one of certain operational variables and changes in operational variables for changing the position of said auxiliary throttle for changing the λ value;
   timing means connected to said control means for generating selected times for operation of said control means;
   means for setting the mixture composition in accordance with changes in specific operational variables,
   means responsive to said control means for determining the optimum output of said setting means, and
   wherein said control means for said auxiliary valve provides a brief test deflection of the auxiliary valve and wherein the influencing of the mixture composition for optimum output through a change in the operational variable ascertained by the actuation of the auxiliary valve occurs only when, after the termination of the brief test deflection of the auxiliary valve, the same operational state of the engine is still present as was present at the beginning of the release of the deflection.

2. An apparatus for optimizing fuel consumption operational variables of an internal combustion engine comprising:
   means for detecting changes in operational variables of said engine;
   an intake manifold having a throttle valve for controlling air flow to said engine;
   a control means responsive to at least one of the following conditions: the appearance of at least one of certain operational variables and changes in operational variables for changing the position of said throttle valve for changing the λ value;
   timing means connected to said control means for generating selected times for operation of said control means;
   means for setting the mixture composition in accordance with changes in specific operational variables,
   means responsive to said control means for determining the optimum output of said setting means, and
   including an electronic gas pedal for the throttle valve, wherein the control means provides a brief test deflection of the throttle valve, and wherein the influencing of the mixture composition for optimum output through a change in the operational variable ascertained by the actuation of the throttle valve occurs only when, after the termination of the brief test deflection of the throttle valve, the same operational state of the engine is still present as was present at the beginning of the release of the test deflection.

3. An apparatus for optimizing fuel consumption operational variables of an internal combustion engine comprising:
   means for detecting changes in operational variables of said engine;
   an intake manifold having a throttle valve and a bypass channel bypassing said throttle valve for controlling air flow to said engine;
   an auxiliary throttle valve in said bypass channel;
   a control means responsive to at least one of the following conditions: the appearance of at least one of certain operational variables and changes in operational variables for changing the position of said auxiliary throttle for changing the λ value;
   timing means connected to said control means for generating selected times for operation of said control means;
   means for setting the mixture composition in accordance with changes in specific operational variables;
   means responsive to said control means for determining the optimum output of said setting means, and
   wherein the degree of deflection of the auxiliary valve by said control means is dependent on operational variables for the purpose of generating a test deflection of the auxiliary valve.

4. An apparatus for optimizing fuel consumption operational variables of an internal combustion engine comprising:

means for detecting changes in operational variables of said engine;

an intake manifold having a throttle valve and a bypass channel bypassing said throttle valve for controlling air flow to said engine;

an auxiliary throttle valve in said bypass channel;

a control means responsive to at least one of the following conditions: the appearance of at least one of certain operational variables and changes in operational variables for changing the position of said auxiliary throttle for changing the λ value;

timing means connected to said control means for generating selected times for operation of said control means;

a controllable carburetor for setting the mixture composition in accordance with changes in specific operational variables, means responsive to said control means for determining the optimum output of said setting means, wherein the engine has a fuel metering system, and wherein the mixture composition set by the setting means is determined by fuel metering, and wherein the deflection of the auxiliary valve by said control means is dependent on the particular throttle valve opening angle at that time.

* * * * *